United States Patent [19]

Francis

[11] 4,304,426
[45] Dec. 8, 1981

[54] PIPE FITTING

[76] Inventor: Robert A. Francis, P.O. 306, Collingwood, Victoria, Australia, 3066

[21] Appl. No.: 115,038

[22] Filed: Jan. 24, 1980

[30] Foreign Application Priority Data

Jan. 30, 1979 [AU] Australia ................................ PD7484

[51] Int. Cl.³ .............................................. F16L 21/06
[52] U.S. Cl. ..................................... 285/323; 285/347
[58] Field of Search ............... 285/322, 323, 105, 104, 285/113, 347, 339, 108, 307, 39

[56] References Cited

U.S. PATENT DOCUMENTS

| 3,653,689 | 4/1972 | Supy | 285/322 X |
| 3,743,326 | 7/1973 | Courtot | 285/323 X |
| 3,884,513 | 5/1975 | Gassert | 285/322 |
| 3,909,046 | 9/1975 | Legris | 285/323 X |
| 4,021,062 | 5/1977 | Mariaulle | 285/34 |
| 4,123,090 | 10/1978 | Kotsakis | 285/39 |

FOREIGN PATENT DOCUMENTS 455164 11/1971 Australia .
2631650 2/1977 Fed. Rep. of Germany ...... 285/322

Primary Examiner—Dave W. Arola
Attorney, Agent, or Firm—Frost & Jacobs

[57] ABSTRACT

A pipe fitting including a socket having a bore and an opening communicating with the bore. Means within the bore defining a surface inclined to the axis of the bore. Movable clamping means provided to abut the inclined surface whereby to clamp a pipe upon movement of the pipe outwardly of the bore, tubular means within the bore located between the movable clamping means and the opening. The tubular means fitting over the pipe first sealing means between the pipe and the tubular means and second sealing means between the tubular means and the socket.

11 Claims, 6 Drawing Figures

PIPE FITTING

The present invention relates to a method of and means for providing a branch pipe or fitting connection or attachment for hydraulic and pneumatic systems, for household or other usage, adapted to contain and transmit fluid under pressure. The invention has been particularly devised for use in making further connections for pipes and/or tubing, regardless of whether such pipes and/or tubing are constructed of metal or of a plastics material. In this regard it should be noted that plastics material is now enjoying usage, on an ever-increasing scale, by plumbers and the like tradesmen. Throughout the specification the expression "pipes of plastics material" is intended to include pipes and/or tubing when constructed from, for example, rigid or plasticized polyvinylchloride, polyethylene or any other suitable plastics material.

In the past, many different types of assemblies have been proposed and used in the relevant art for establishing branch pipe or fitting connections. Circumstances calling for the use of such connections include, for example, the formation of a tee, an elbow or a joiner in a pipe line or hydraulic system, or alternatively perhaps the mere provision of a cap or end connector on a gas or water pipe. Generally speaking such assemblies have consisted of a plurality of co-operating elements which are adapted to be positioned around the relevant pipe line and then attached together or interconnected in any known manner.

The assemblies or fittings previously employed for the interconnection of pipes and the like and for the formation of the aforementioned tees, elbows etc., have not proven entirely satisfactory for a number of reasons. Firstly, most of the known types of fittings comprise a considerable number of parts requiring the services of a skilled workman to install so as to avoid errors in actual installation. Secondly, fastening devices such as screws, nuts, wedges and other fixing means are often employed, which devices have been found to be difficult to handle. A third drawback is associated with the fact that different standards are at present in use in different countries in relation to piping or tubing for hydraulic purposes.

By way of exemplification of the above-mentioned third drawback, in accordance with presently enforced standards different types and grades of types are employed dependent upon the pressure those pipes are designed or intended to carry. One such standard utilizes in hydraulic pipe-lines a uniform outside diameter, regardless of the fluid pressure involved. With such a system the wall thickness of the pipe is increased, and hence the internal diameter or bore decreased, in proportion to the increase in fluid pressure involved.

Another standard applicable in certain countries, as for example Australia, utilizes piping or tubing having a uniform sized bore or internal diameter. In accordance with this standard the wall thickness is again increased in proportion to the fluid pressure involved. However, since the bore or internal diameter is maintained constant, then the outside diameter will vary according to fluid pressure or usage.

In accordance with known procedures, in order to allow for fitting and/or joining of pipes or tubing to taps, faucets, other pipes in the form of branch conduits etc., it is often necessary to insert a so-called tail-piece or end fitting into the open end of the pipe or tubing concerned. However, since the known and presently used standard hydraulic systems could involve a variety of different sized pipes, that is with variation in either the bores and/or the outside diameters thereof, then any such fitting and/or joining might necessitate the usage in the same hydraulic system of an equivalent number of different sized tail-pieces or end fittings. It can therefore be seen that, in accordance with the known state of the art, plumbers and the like tradesmen, hardware stores and other suppliers of and outlets for hardware for use by such tradesmen are required to carry or retain in stock a large number of different sized and configured fittings, end pieces, tail-pieces and the like whereby to cater for all feasible work situations. Such a requirement, needless to say, gives rise to problems in terms of storage space and also necessitates additional expenditure by way of initial outlay involved in establishing a trade or business.

Australian Patent specification No. 455,164 in the name of S. A. Legris Fils describes a pipe fitting in which a collet or thimble is interposed between the pipe and the body of the fitting.

The collet is designed to grip the pipe to prevent it being withdrawn from the fitting and an "O" ring seal provided in front of the collet seals the connection. Whilst fittings of this type can cater for different pipe diameters using different "O" ring and collet sizes, testing has shown that such fittings, whilst they may be suitable for small bore high pressure air applications, do not perform satisfactorily when used for liquid applications.

The present invention seeks to reduce at least some of the problems and disadvantages associated with the prior art arrangements by providing a branch pipe or fitting connection or attachment for hydraulic or pneumatic systems which is adaptable for use in a variety of situations.

In accordance with the present invention there is provided an assembly for providing a branch pipe or fitting connection or attachment for pipe systems including a socket having a bore and an opening communicating with said bore, means within said bore defining a surface inclined to the axis of said bore, movable clamping means provided within said bore and being constructed to co-operate with said inclined surface to clamp a pipe upon movement of said pipe outwardly of said bore, tubular means within said bore located between said movable clamping means and said opening, said tubular means fitting over said pipe, first sealing means between said pipe and said tubular means and second sealing means between said tubular means and said socket.

In accordance with the invention there is also provided a method of interconnecting pipe utilizing an assembly of the aforementioned type.

In another aspect of the invention there is provided a pipe fitting including a socket having a bore and an opening communicating with said bore, separate insert means secured within said bore defining a surface inclined to the axis of said bore, movable clamping means provided to abut said inclined surface whereby to clamp a pipe upon movement of said pipe outwardly of said bore and sealing means acting to seal the gap between the outer periphery of said pipe and said bore.

In order that the invention may be more clearly understood and put into practical effect there shall now be described in detail preferred constructions of an assembly in accordance with the invention. The ensuing description is given by way of non-limitative example only and is with reference to the accompanying drawings, wherein.

Figure 1:
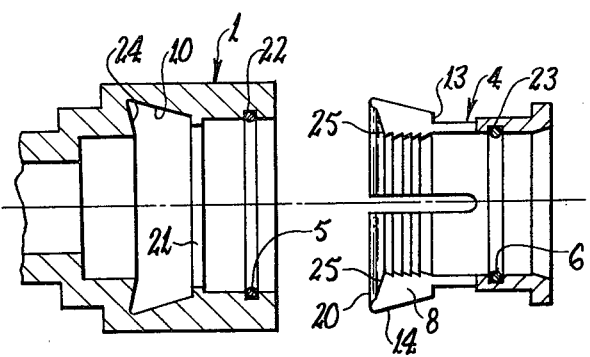
FIG. 1 represents an exploded cross sectional view of the separate elements making up an assembly in accordance with a first embodiment of the present invention.

In the drawings numeral 1 refers to an end-piece or fitting adapted in use to be secured in any known manner to a main conduit or pipe line. In accordance with the present invention there is to be provided a means allowing for the connection of the main conduit or pipe line to a secondary pipe line 2. In the preferred embodiment illustrated the secondary pipe line 2 is, as shown in FIG. 2, cut off and bevelled at the end section 3 thereof.

In accordance with one aspect of the present invention, in order to allow for interconnection of the main conduit or pipe line and the secondary pipe line 2 there is provided an assembly including the end-piece or fitting 1 and a second member, hereinafter referred to as a collet or thimble member 4. The collet or thimble member 4 is constructed in such a way that it can be pushed into the fitting 1. In order to facilitate sealing of the assembly there are provided annular sealing rings, in the form for example of "O" rings 5 and 6, adapted to be located as shown in FIG. 1 in relation to the end-piece or fitting 1 and the collet or thimble member 4. In an alternative embodiment a V-ring 7 may be substituted for the "O" ring 6 whereby to allow for the situation wherein the different pipe diameters require a fitting with greater tolerance.

The thimble member 4 further includes a series of slots 8 extending longitudinally thereof. In an especially preferred arrangement, as illustrated for example in FIG. 8 there are provided four such slots 8 which split this end of the collet into four claw members.

Figure 2:
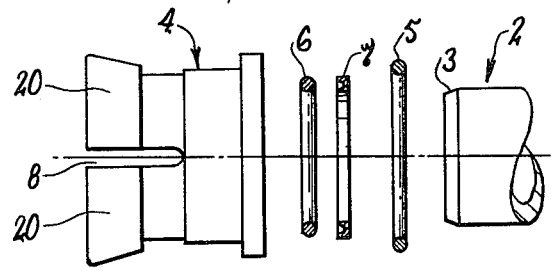
FIG. 2 represents an exploded view of the means allowing for interconnection of a collet or thimble member with a pipe in accordance with the embodiment of FIG. 1.
Figure 3:
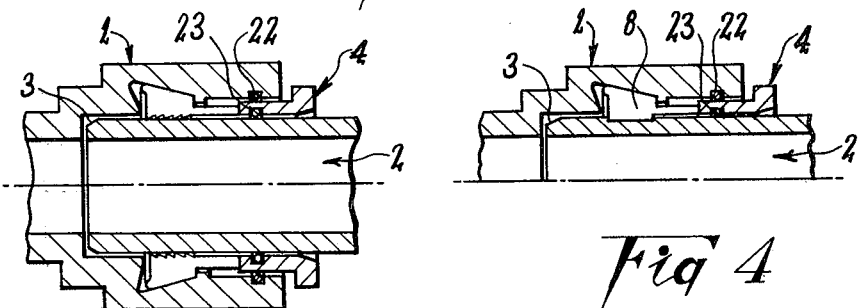
FIG. 3 represents a cross sectional view of a pipe fitting assembly in accordance with the present invention.

In accordance with the preferred embodiment of FIGS. 1 to 3 the thimble member 4 further includes, at the insertion end thereof, a threaded, grooved or serrated portion 9.

In operation the claws 20 of the thimble member 4 allow for compression of the insertion end of that thimble member 4 thereby allowing for deposition of the member 4 into the end-piece or fitting 1. In this respect it should be noted that the internal configurations of the respective end-piece or fitting 1 and the thimble member 4 are more or less complementary. The tapered or expanding section 10 of the end-piece or fitting 1 allows the thimble member 4 to return to its uncompressed or normal condition and stop means such as the annular protrusion 21 which abut the shoulder 13 forming part of the thimble may be included as an integral part of the fitting 1 to prevent withdrawal of the thimble member 4 after insertion therein. In such a configuration annular sealing means such as the "O" ring 5 effectively seal off the gap between the fitting 1 and the external surface of the thimble member 4. The fitting preferably includes an annular recess 22 which serves to house the sealing ring 5 and prevents it from being pushed from the fitting by fluid pressure. Once the end-piece 1 and the thimble member 4 are interconnected in this manner it will be possible, merely as a result of a pushing action, to insert the pipe line 2 into the assembly, as shown for example in FIG. 3. In that arrangement further sealing means such as the "O" ring 6 or alternatively the V-ring 7, located internally of the thimble member 4 and preferably within an annular recess 23, provide an effective seal between the thimble member 4 and the pipe line 2.

In this regard it should be noted that the "O" ring 6 causes the thimble member 4 to be in friction fit engagement with the pipe line 2. In fact, once the pipe line 2, end-piece or fitting 1 and thimble member 4 are thus interconnected, any attempt to separate the assembly, as for example by attempting to pull the pipe line 2 outwardly therefrom, has the effect of pulling the thimble member 4 out as well by virtue of the friction fit effect already described. However, outward movement of the thimble leads to camming interaction between the inclined surface 10 formed internally of the fitting 1 and the corresponding inclined surfaces 14 forming part of the claws 20 of the thimble. This camming action causes the claws to be pushed inwardly whereby the serrations or teeth 9 formed on the inner surface grip into the pipe thereby preventing separation of the assembly.

This type of assembly is particularly effective in situations where pipe lines are subjected to a pulsating fluid pressure. As the fluid pressure increases it acts on the relatively large sealed surface area presented by the thimble member and associated seals to push it back, which in turn increases the gripping effect of the claws 20 on the pipe. Thus the likelihood of the pipe being ejected through sudden pressure surges is greatly reduced.

Figure 4:
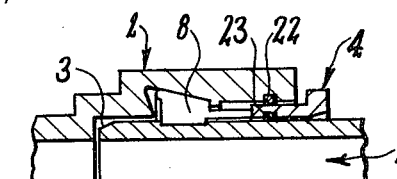
FIG. 4 represents a view, similar to that of FIG. 3 showing an alternative embodiment of an assembly in accordance with the present invention.
Figure 5:
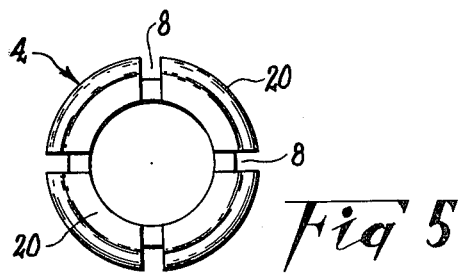
FIG. 5 is a view taken along the line B—B of FIG. 1.

In accordance with an alternative embodiment, as shown for example in FIG. 4, a metal pipe or tube 2 may be employed. Under such a circumstance a groove 11 may be provided in the end portion of the pipe line 2. The leading or insertion end portion of the thimble member 4 may then be shaped so as to engage in the groove 11 of the pipe line 2 and thereby prevent ready separation of the pipe line 2 from the overall assembly.

With the present arrangement it is possible to allow for interconnection of pipe lines of different sizes merely by the utilization of thimble members 4 of different sizes. In this regard, and in accordance with an especially preferred embodiment, the thimble members 4 may be colour coded in accordance with their sizing, in a similar manner to that colour coding presently employed in relation to pipes and tubing.

In accordance with a further feature of the present invention it is also possible to achieve, in a particular manner, separation of the pipe line 2 from the overall assembly. To be more specific, if it is desired to unload the assembly then it would be necessary merely to push the end 26 of the thimble member 4 which protrudes from the fitting 1 inwardly.

Upon such an inward pushing action, the ramped or tapered portion 24 of the end-piece or fitting 1 interacts with the corresponding ramped or tapered portions 25 of the claws 20 to push same outwardly and hence release them from gripping engagement with the pipe.

The pipe may be withdrawn so long as the inward pressure on the thimble member is maintained.

It should be noted that, in accordance with an especially preferred embodiment, both the end-piece or fitting 1 and the thimble member 4 will be constructed of a suitable plastics material. However, it would be equally possible to have one, or perhaps even both, of those members constructed of a metallic material, or alternatively, the main body of the thimble member 4 may be constructed of plastic and the teeth or serrations may consist of appropriately formed metal inserts.

Figure 6:
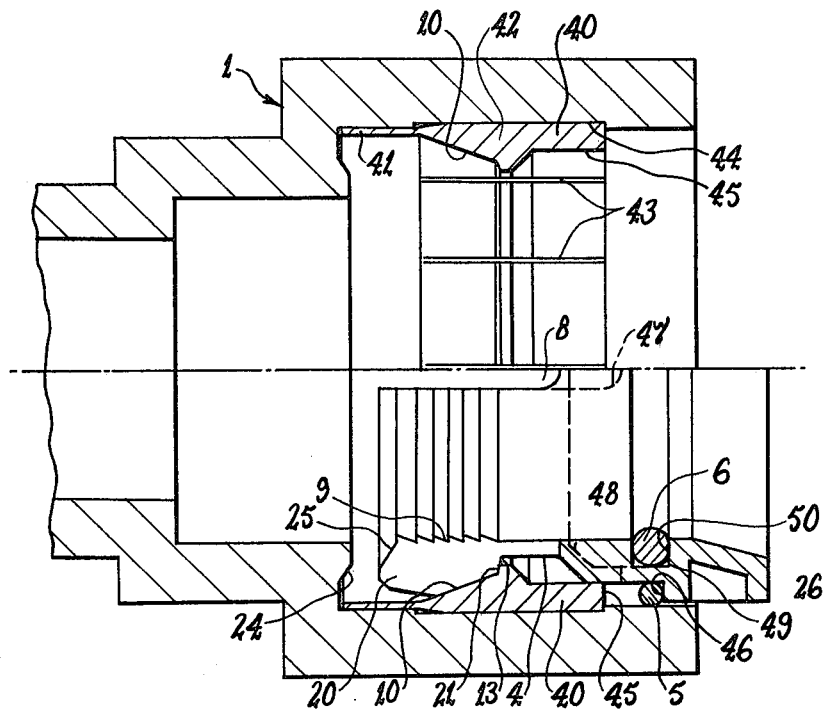
FIG. 6 illustrates a partial section of an alternative fitting design constructed in accordance with the invention.

In FIG. 6, the same numbering system is used for features which are equivalent to those shown in the previous embodiment. The main distinguishing feature of the embodiment of FIG. 6 as compared with the preceding drawings is the provision of a separate insert 40 within the end piece 1 to provide the necessary inclined portion and stop means for the functioning of the thimble or collet member 4.

The insert 40, which may be readily moulded by conventional plastics moulding techniques comprises a relatively thin annular ring portion 41 with a diameter which allows it to fit snugly into the end piece 1 in the manner illustrated. A section 42, of slightly larger diameter than the ring portion 41 and incorporating a ramp 10 and shoulder 13 is formed as an integral extension of the ring 41. This extended portion may be provided with a number of splits 43 forming the extended portion into a plurality or segments to the oversized diameter portion of the insert 40 to be compressed slightly when it is pushed into the end piece 1.

The end piece 1 differs from the end pieces described in relation to the embodiments of FIGS. 1 to 4 in that it includes a broad and shallow annular channel 44. Thus the enlarged section 42 of the insert 40 may resiliently expand into the channel 44 to hold it securely in the end piece and to give the combined insert/end-piece an internal profile which is similar to that of the other end pieces. The end of the insert 45 also acts as one side of an "O"-ring groove for the "O" ring 5, the other side of the groove being formed by an annular flange or shoulder 46 formed on the collet or thimble. The advantage of this type of construction is that the "O"-ring groove for the seal 5 and the internal profile of the insert/end piece can be formed using conventionally moulded components without the need for a machining step.

It is also possible to form an "O"-ring groove on the interior of the collet for the "O"-ring seal 6 by extending the splits 8 in the collet to the position indicated by the dotted line 47. This increases the flexibility of the claw sections of the collet so that the ring 48 marked in dotted lines can be slipped into the position shown in the drawing to form the annular "O"-ring groove 49 between the side of the ring 48 and the annular shoulder 50 which forms part of the collet. If this method is used, it should be possible to avoid machining operations completely in the construction of the fitting.

Finally, it is to be understood that the aforegoing description refers merely to preferred embodiments of the present invention and that variations and modifications are possible without departing from the spirit and scope of the invention.

I claim:

1. A pipe fitting including a socket having a bore and an opening communicating with said bore, means within said bore defining a surface inclined to the axis of said bore, movable clamping means adapted to clamp a pipe end extending within said bore, said clamping means including a surface substantially complimentary to said inclined surface and adapted to abut said inclined surface upon movement of said pipe outwardly of said bore to compress said clamping means to increase the clamping action thereof on said pipe, tubular means within said bore located between said movable clamping means and said opening, said tubular means fitting over said pipe, first sealing means between said pipe and said tubular means, and second sealing means between said tubular means and said socket, said first and said second sealing means being located adjacent said opening, whereby to be unaffected by said compression of said clamping means.

2. A pipe fitting according to claim 1 wherein said movable clamping means are connected to said tubular means.

3. A pipe fitting according to claim 2 wherein said clamping means comprise a plurality of claws each having a serrated or toothed surface which is adapted to grip said pipe.

4. A pipe fitting according to claim 1 wherein said first and second sealing means comprise resilient "O"-rings.

5. A pipe fitting according to claim 3 wherein said tubular means project beyond the opening of said socket.

6. A pipe fitting according to claim 5 wherein said fitting includes an internal ramp which is adapted to co-operate with corresponding ramp means provided on the end of each of said claws to move said claws out of gripping engagement with said pipe when the projecting end of said tubular means is pushed into said socket.

7. A pipe fitting according to claim 1 wherein said socket includes stop means which are adapted to co-operate with corresponding stop means associated with said movable clamping means to prevent removal of said movable clamping means from said socket.

8. A pipe fitting according to claim 3 wherein said stop means comprise an annular projection formed within said socket and said corresponding stop means comprise a shoulder formed as part of each of said claws.

9. A pipe fitting including a socket having a bore and an opening communicating with said bore, separate insert means secured within said bore defining a surface inclined to the axis of said bore, movable clamping means adapted to clamp a pipe and extending within said bore, said clamping means including a surface substantially complementary to said inclined surface of said separate insert means and adapted to abut said inclined surface upon movement of said pipe outwardly of said bore to compress said clamping means to increase the clamping action thereof on said pipe, first sealing means between said pipe and said movable clamping means, and second sealing means between said movable clamping means and said bore, said first and second sealing means being located adjacent said opening, whereby to be unaffected by compression of said clamping means.

10. A pipe fitting according to claim 9 wherein said separate insert means comprise a collar adapted to fit snugly within said bore and a portion of enlarged diameter integral with said collar, said inclined surface being formed as part of the interior of said enlarged diameter portion, said enlarged diameter portion being split into a plurality of segments whereby said enlarged diameter portion may be compressed when said insert means are pushed into said bore.

11. A pipe fitting according to claim 9 wherein said bore includes an annular channel shaped to receive said enlarged diameter portion with one end of said enlarged diameter portion abutting one side of said channel whereby to impede removal of said insert means from said bore.

* * * * *